June 29, 1954  G. R. ANCHORS  2,682,084
METHOD OF DUPLICATING FALSE TEETH
Filed May 3, 1950
*Fig. 1.*
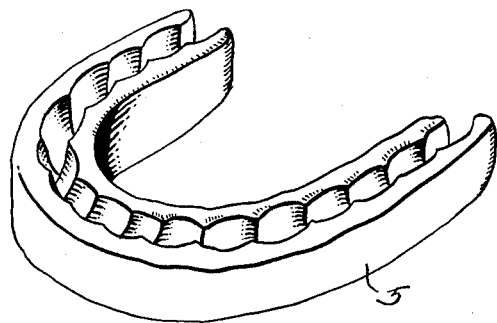
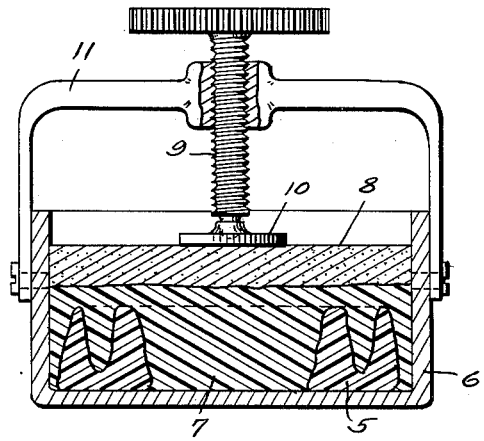
*Fig. 2.*
G. R. Anchors
INVENTOR
BY
ATTORNEYS.

Patented June 29, 1954

2,682,084

UNITED STATES PATENT OFFICE 2,682,084

METHOD OF DUPLICATING FALSE TEETH

George R. Anchors, Evansville, Ind.

Application May 3, 1950, Serial No. 159,815

1 Claim. (Cl. 18—55.1)

This invention relates to a method of duplicating false teeth, by reproducing the teeth of an old plate in plastic tooth material, to insure an identical reproduction.

Another object of the invention is to produce plastic teeth in a line to be secured to the plastic material used in making the body of the plate, and which may be secured to the body of the plate in the desired manner.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing:

Figure 1 is a perspective view of an impression which has been made from the teeth of the original plate.

Fig. 2 is a view illustrating the impression element positioned in a metal container in which plastic material is pressed in the formation of the teeth.

In carrying out the method forming the subject matter of the present invention, an elastic impression cream known to the dental profession as "D. P." is packed around the teeth of the denture, and when the elastic impression cream has set, the denture is removed from it, leaving molds of the teeth of the old denture, of shapes identical with the teeth to be duplicated.

The tooth molds are now packed with plastic tooth material and slight pressure is applied to give it greater density, which is done by pouring a quick setting plaster over the plastic material in the molds, and since the plaster sets faster than the plastic tooth material pressure may be supplied to the set plaster which will be transmitted to the plastic tooth material and this slight pressure will cause the plastic tooth material to attain the desired density. As shown by Fig. 2 of the drawing, the impression member is indicated by the reference character 5, and this impression member is placed in the receptacle 6 with the teeth molds disposed upwardly.

The elastic material 7 is now placed within the receptacle around the teeth on the plate and allowed to set.

The reference character 8 indicates a layer of fast setting plaster, which is positioned directly on the impression cream 7, and since the fast setting plaster sets prior to the setting of the plastic material, slight pressure may be directed to the plastic material, through the fast setting plaster, by means of the pressure screw 9 that carries the head 10 on its inner end, which head is in direct contact with the fast setting plaster which has formed a layer on the impression cream, thereby insuring an even pressure being applied throughout the entire surface of the impression cream. The screw 9 operates through a threaded bore formed in the yoke 11 that has connection with the container 6.

By rotating the pressure screw 9, an even pressure may be directed to the fast setting plaster 8 which will force the plastic material into the tooth molds forming the teeth in a line, so that the line of teeth may be secured to a dental plate by welding.

The plastic teeth formed in the elastic molds at slight pressure, eliminate the corroded pins of porcelain teeth which deteriorate with use.

Having thus described the invention, what is claimed is:

A method of identically reproducing teeth from a denture mold, consisting in providing a tooth mold, placing the tooth mold in a denture receptacle, covering the tooth mold within said receptacle with plastic tooth material, covering the plastic tooth material with a layer of quick setting plastic material positioned in contact with the plastic tooth material, subjecting the plastic tooth material and layer of quick setting plastic material to pressure, providing a denture, and finaly removing the denture from the mold.

References Cited in the file of this patent

UNITED STATES PATENTS

| Number | Name | Date |
|---|---|---|
| 752,378 | Dailey | Feb. 16, 1904 |
| 779,979 | Walter | Jan. 10, 1905 |
| 1,846,012 | Becker | Feb. 23, 1932 |
| 2,101,431 | Groff | Dec. 7, 1937 |
| 2,297,067 | Shapiro | Apr. 7, 1942 |
| 2,392,929 | Lee | Jan. 15, 1946 |
| 2,428,094 | Raymond | Sept. 30, 1947 |